(12) United States Patent
Sun

(10) Patent No.: US 9,730,122 B2
(45) Date of Patent: Aug. 8, 2017

(54) METHOD AND TERMINAL FOR PROCESSING DATA TRANSMISSION SERVICE

(71) Applicant: ZTE CORPORATION, Shenzhen (CN)

(72) Inventor: Changjiang Sun, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 372 days.

(21) Appl. No.: 14/370,681

(22) PCT Filed: Dec. 27, 2012

(86) PCT No.: PCT/CN2012/087684
§ 371 (c)(1),
(2) Date: Jul. 3, 2014

(87) PCT Pub. No.: WO2013/113243
PCT Pub. Date: Aug. 8, 2013

(65) Prior Publication Data
US 2014/0334315 A1 Nov. 13, 2014

(30) Foreign Application Priority Data
Feb. 3, 2012 (CN) .......................... 2012 1 0024555

(51) Int. Cl.
*H04W 36/00* (2009.01)
*H04W 76/02* (2009.01)
(Continued)

(52) U.S. Cl.
CPC ..... *H04W 36/0066* (2013.01); *H04W 76/028* (2013.01); *H04W 76/068* (2013.01); *H04W 68/12* (2013.01); *H04W 88/06* (2013.01)

(58) Field of Classification Search
CPC .......... H04W 36/0066; H04W 76/028; H04W 76/068; H04W 68/12; H04W 88/06
See application file for complete search history.

(56) References Cited

U.S. PATENT DOCUMENTS

| 2003/0207702 A1 | 11/2003 | Chen |
| 2005/0054298 A1 | 3/2005 | Chen |
| 2009/0116378 A1* | 5/2009 | Jen ...................... H04L 41/0668 370/216 |

FOREIGN PATENT DOCUMENTS

| CN | 101287199 | 10/2008 |
| CN | 102083161 | 6/2011 |
| WO | WO 2011/060998 | 5/2011 |

OTHER PUBLICATIONS

TS 25.331 V11.0.0, "Radio Resource Control (RRC); Protocol specification (Release 11)", Dec. 2011.*
(Continued)

*Primary Examiner* — Charles C Jiang
*Assistant Examiner* — Oussama Roudani
(74) *Attorney, Agent, or Firm* — Pearl Cohen Zedek Latzer Baratz LLP

(57) ABSTRACT

A method for processing data transmission services and a terminal are disclosed. The method includes: after a radio link disconnection occurs in a process of only performing the data transmission services of a packet-switched domain in a dedicated state, if judging that a timing value configured with a first timer is 0, a terminal deleting a radio access bearer and a signaling connection of the packet-switched domain; and if judging that a timing value configured with a second timer is not 0, initiating a cell update process, wherein, the first timer is a timer used for monitoring reestablishment of packet-switched domain services; the second timer is a timer used for monitoring reestablishment of circuit-switched domain services. According to the above (Continued)

scheme, the flow of processing a stream interruption of the terminal in a data transmission process can be perfected, and the drawbacks of the existing flow can be solved.

8 Claims, 2 Drawing Sheets

(51) Int. Cl.
*H04W 76/06* (2009.01)
*H04W 68/12* (2009.01)
*H04W 88/06* (2009.01)

(56) References Cited

OTHER PUBLICATIONS

Nokia, "Iur backward compatibility problem", Change Request, Jeju Island, Korea (Nov. 7, 2007).

* cited by examiner

METHOD AND TERMINAL FOR PROCESSING DATA TRANSMISSION SERVICE

CROSS-REFERENCE TO RELATED APPLICATIONS

This application is a National Phase Application of PCT International Application No. PCT/CN2012/087684, entitled "METHOD AND TERMINAL FOR PROCESSING DATA TRANSMISSION SERVICE", International Filing Date Dec. 27, 2012, published on Aug. 8, 2013 as International Publication No. WO 2013/113243, which in turn claims priority from Chinese Patent Application No. 201210024555.0, filed Feb. 3, 2012, all of which are incorporated herein by reference in their entirety.

TECHNICAL FIELD

The present document relates to the field of mobile communication, and particularly, to a method for processing data transmission services and a terminal after a stream interruption occurs when the terminal carries out uploading and downloading services in the 3rd Generation (3G) mobile communication system.

BACKGROUND OF THE RELATED ART

In the mobile communication system, when the terminal carries out the data transmission services of uploading and downloading, since an air interface is for radio transmission, a link disconnection appearing in the area with a worse signal coverage is quite normal. After the link disconnection appears, the terminal needs to determine whether to perform a link reestablishment according to the sizes of reestablishment timers (T314 and T315) configured by the network side for the terminal and the current service state, once a reestablishment is initiated, it is required to use the reestablishment timers to monitor a reestablishment process of the link, if the reestablishment is successful before the timer times out, the link can be restored, otherwise it needs to delete a bearer on which the services are transmitted at the moment. The T314 is generally used for monitoring the reestablishment of Circuit Switched (CS) domain services, and the T315 is generally used for monitoring the reestablishment of Packet Switched (PS) domain services. After the Release 7 upgrade, monitoring objects of the T314 and T315 are changed, it causes that a scenario where the terminal cannot process exists.

Before the Release 7 upgrade, the reestablishment timer T314 and the reestablishment timer T315 respectively monitor the CS service Radio Access Bearer (RAB) and the PS service RAB, and the processing flow after the link of the terminal disconnects is that:

when both a value of the T314 and a value of the T315 are 0, or when the T314 is 0 and the T315 is not 0 and the RAB of the reestablishment timer T315 is not configured, a User Equipment (UE) returns to an idle state, and if there is a service requirement afterwards, the upper layer of the protocol stack triggers the service reestablishment.

When the T314 is 0, all the locally configured RABs of reestablishment timers T314 are deleted.

When the T315 is 0, all the locally configured RABs of reestablishment timers T315 are deleted.

If the T315 is not 0, and the RAB of the reestablishment timer T315 is configured currently, the timer T315 is started; and if such RAB is not configured currently, the timer is not started.

If the T314 is not 0, and the RAB of the reestablishment timer T314 is configured currently, the timer T314 is started; and if such RAB is not configured currently, and the T315 is not started at present, the T314 is also started.

If one of the T314 and T315 is started, a cell update is initiated, with the reason Radio Link Failure (RLFail) being carried.

After the Release 7 upgrade, monitoring objects of the reestablishment timers are changed, the T314 and the T315 respectively monitor the CS signaling connection and the PS signaling connection. The processing flow after the link of the terminal disconnects after the upgrade is that:

when both a value of the T314 and a value of the T315 are 0, or when the T314 is 0 and the T315 is not 0 and the PS signaling connection does not exist currently, the UE returns to an idle state, and if there is a service requirement afterwards, the upper layer of the protocol stack triggers the service reestablishment.

When the T314 is 0, the locally configured CS RAB is deleted and the CS signaling connection is deleted.

When the T315 is 0, the locally configured PS RAB is deleted and the PS signaling connection is deleted.

If the T315 is not 0, and the RAB of the reestablishment timer T315 is configured currently, or the PS signaling connection exists currently, the timer T315 is started; and if such RAB is not configured currently, the timer is not started.

If the T314 is not 0, and the RAB of the reestablishment timer T314 is configured currently, the timer T314 is started; and if no RAB exists currently, and the CS signaling connection exists, the T314 is also started.

If one of the T314 and T315 is started, a cell update is initiated, with the reason RLFail being carried.

The above scheme has the following problem: after the link of the terminal disconnects after the release R7 upgrade, when the T314 is not 0 and there is no signaling connection currently exists, the UE does not know how to process.

SUMMARY OF THE INVENTION

The technical problem required to be solved by the present document is to provide a method for processing data transmission services and a terminal, to perfect the processing flow after the link of the terminal disconnects.

In order to solve the above technical problem, the present document provides a method for processing data transmission services, which comprises:

after a radio link disconnection occurs in a process of only performing the data transmission services of a packet-switched domain in a dedicated state, when a terminal judges that a timing value configured with a first timer is 0, deleting a radio access bearer and a signaling connection of the packet-switched domain; and when judging that a timing value configured with a second timer is not 0, initiating a cell update process, wherein, the first timer is a timer used for monitoring a reestablishment of packet-switched domain services;

the second timer is a timer used for monitoring a reestablishment of circuit-switched domain services.

Preferably, the above method can be further characterized in that: after the terminal judges that the timing value configured with the second timer is not 0, the method further comprises:
the terminal starting the second timer.

In order to solve the above problem, the present document further provides a terminal, which comprises:
a first module, configured to: after a radio link disconnection occurs in a process of only performing data transmission services of a packet-switched domain in a dedicated state, when judging that a timing value configured with a first timer is 0, delete a radio access bearer and a signaling connection of the packet-switched domain; and
a second module, configured to: when judging that a timing value configured with a second timer is not 0, initiate a cell update process, wherein,
the first timer is a timer used for monitoring a reestablishment of packet-switched domain services;
the second timer is a timer used for monitoring a reestablishment of circuit-switched domain services.

Preferably, the above terminal can be further characterized in that:
the second module is configured to: in a case that the first module judges that the timing value configured with the second timer is not 0, start the second timer.

In order to solve the above problem, the present document further provides a method for processing data transmission services, which comprises:
after a radio link disconnection occurs in a process of only performing the data transmission services of a packet-switched domain in a dedicated state, when a terminal judges that a timing value configured with a first timer is 0, deleting a radio access bearer and a signaling connection of the packet-switched domain; and
when judging that a timing value configured with a second timer is not 0 and no circuit-switched domain signaling connection exists, and returning to an idle state, wherein,
the first timer is a timer used for monitoring a reestablishment of packet-switched domain services;
the second timer is a timer used for monitoring a reestablishment of circuit-switched domain services;

Preferably, the above method can be further characterized in that: after returning to the idle state, the method further comprises:
if the terminal detects that data are still uploaded or a paging message of a network side is received, the terminal initiating a service request to the network side.

In order to solve the above problem, the present document further provides a terminal, which comprises:
a first module, configured to: after a radio link disconnection occurs in a process of only performing data transmission services of a packet-switched domain in a dedicated state, when judging that a timing value configured with a first timer is 0, delete a radio access bearer and a signaling connection of the packet-switched domain; and
a second module, configured to: in a case that the first module judges that a timing value configured with a second timer is not 0 and no circuit-switched domain signaling connection exists, return to an idle state, wherein,
the first timer is a timer used for monitoring a reestablishment of packet-switched domain services;
the second timer is a timer used for monitoring a reestablishment of circuit-switched domain services.

Preferably, the above terminal can be further characterized in that: the terminal further comprises:
a third module, configured to: after the second module returns to the idle state, if detecting that data are still uploaded or a paging message of a network side is received, initiate a service request to the network side.

In conclusion, the embodiments of the present document provide a method for processing the data transmission services and a terminal, to perfect the flow of processing the interruption of the terminal in the data transmission process, which can solve the drawbacks of the existing flow.

PREFERRED EMBODIMENTS OF THE INVENTION

Through the study, the inventor finds that the processing flow after the link of the terminal disconnects after the release upgrade is imperfect, and there exist loopholes, and a scenario is given to describe the problem below.

When the terminal in a dedicated state (Cell-DCH) only carries out uploading and downloading services of the packet-switched domain (only the PS domain RAB is configured), the CS RAB and the CS signaling connection do not exist at the moment, and it is assumed that T314 is configured to be not 0 and T315 is configured to be 0, after the link disconnection occurs, the processing flows of the terminal before and after the release upgrade are described as follows.

According to the processing flow before the upgrade, if the T315 is 0, it is required to delete the PS RAB, but the PS signaling connection exists; and if it is judged that the T314 is not 0 and no RAB exists at the moment, it is required to start the T314, initiate the cell update, try a link reestablishment, and use the T314 to monitor the link reestablishment.

According to the processing flow after the upgrade, if the T315 is 0, it is required to delete the PS RAB and the PS signaling connection; the T314 is not 0 at this point, no RAB exists, and also no signaling connection exists, the T314 cannot be started according to provisions of the protocol, and the UE is not instructed to return to the Idle state. With respect to this situation, the terminal does not know how to process.

Therefore, in conclusion, after the link of the terminal disconnects after the release R7 upgrade, with respect to how the UE to perform processing when the T314 is not 0 and no signaling connection exists at all currently, no specific provision is given at present.

The embodiments of the present document will be described in detail in combination with the accompanying drawings below. It should be noted that the embodiments in the present document and the characteristics in the embodiments can be arbitrarily combined with each other in the condition of no conflict.

In accordance with the current provisions of the processing flow after the R7 upgrade, when the terminal only carries out data transmission services of the packet-switched domain of uploading and downloading in the dedicated (Cell-DCH) state (the PS domain RAB is configured, and the CS RAB and CS signaling connection do not exist), and it is assumed that the T314 is configured to be not 0 and the T315 is configured to be 0 at present, after the radio link disconnection occurs, since the T315 is 0, the UE will delete the PS service and the signaling connection, the T314 is not 0 but the UE does not have any signaling connection at this point, and the terminal does not know how to process in this scenario. Therefore, the present document provides the following three embodiments.

Embodiment 1

Figure 1:
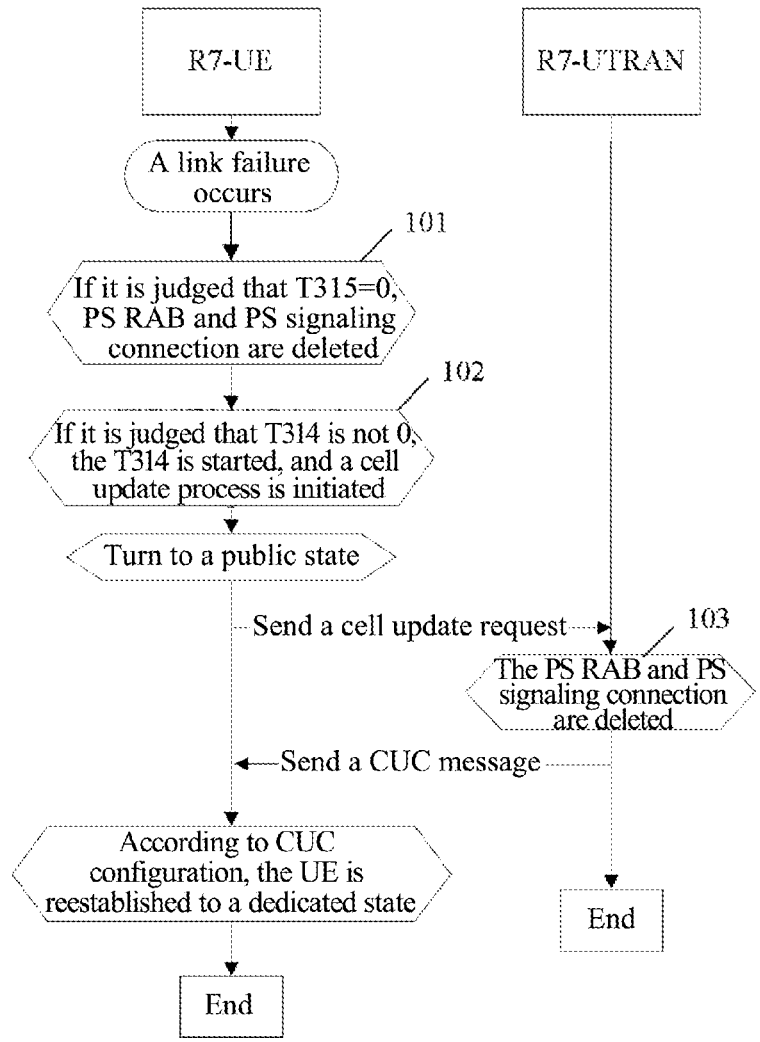
FIG. 1 is a flow diagram of the method for processing the data transmission services according to the embodiment 1 of the present document.

As shown in FIG. 1, the following steps are included.

In step 101, if the UE judges that the T315 is 0, the PS RAB and the PS signaling connection are deleted.

In step 102, if it is judged that the T314 is not 0, though no CS signaling connection exists at this point, the T314 is still started, and a Cell Update (CU) process is initiated, a reason for a cell update is: RLFail, and the T314 is used to monitor the reestablishment process.

In step 103, the network side deletes the PS RAB and the PS signaling connection after receiving a cell update request of the UE; and it can select to send a Cell Update Confirm (CUC) message or a Radio Resource Control (RRC) Connection Release (RRCConnRel) message to respond to the cell update request of the UE.

The network side sending the cell update confirm message is attempting to reestablish the disconnected link; and the network side sending the RRC connection release message is for releasing the RRC connection of the terminal of which the link disconnects at present.

Figure 2:
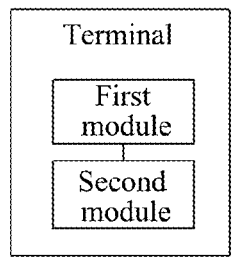
FIG. 2 is a schematic diagram of the terminal according to the embodiments 1 and 2 of the present document.

FIG. 2 is a schematic diagram of the terminal according to the embodiment 1 of the present document, and as shown in FIG. 2, the terminal of the embodiment can include:

a first module, used to: after a radio link disconnection occurs in a process of only performing data transmission services of a packet-switched domain in a dedicated state, if judging that a timing value configured with a first timer is 0, delete a radio access bearer and a signaling connection of the packet-switched domain; and a second module, used to: if judging that a timing value configured with a second timer is not 0, start the second timer, and initiate a cell update process, wherein, the first timer is a timer used for monitoring a reestablishment of packet-switched domain services;

the second timer is a timer used for monitoring a reestablishment of circuit-switched domain services.

Embodiment 2

The processing method is similar to that of the embodiment 1, the difference is just that in step 102, if it is judged that the T314 is greater than 0, but there exists no CS signaling connection at this point, therefore the T314 is not started, and the cell update process is initiated directly, and it is not required to use the T314 to perform monitoring.

FIG. 2 is a schematic diagram of the terminal according to the embodiment 2 of the present document, and as shown in FIG. 2, the terminal in the embodiment can include:

a first module, used to: after a radio link disconnection occurs in a process of only performing data transmission services of a packet-switched domain in a dedicated state, if judging that a timing value configured with a first timer is 0, delete a radio access bearer and a signaling connection of the packet-switched domain; and a second module, used to: if judging that a timing value configured with a second timer is not 0, initiate a cell update process, wherein, the first timer is a timer used for monitoring a reestablishment of packet-switched domain services;

the second timer is a timer used for monitoring a reestablishment of circuit-switched domain services.

Embodiment 3

Figure 3:
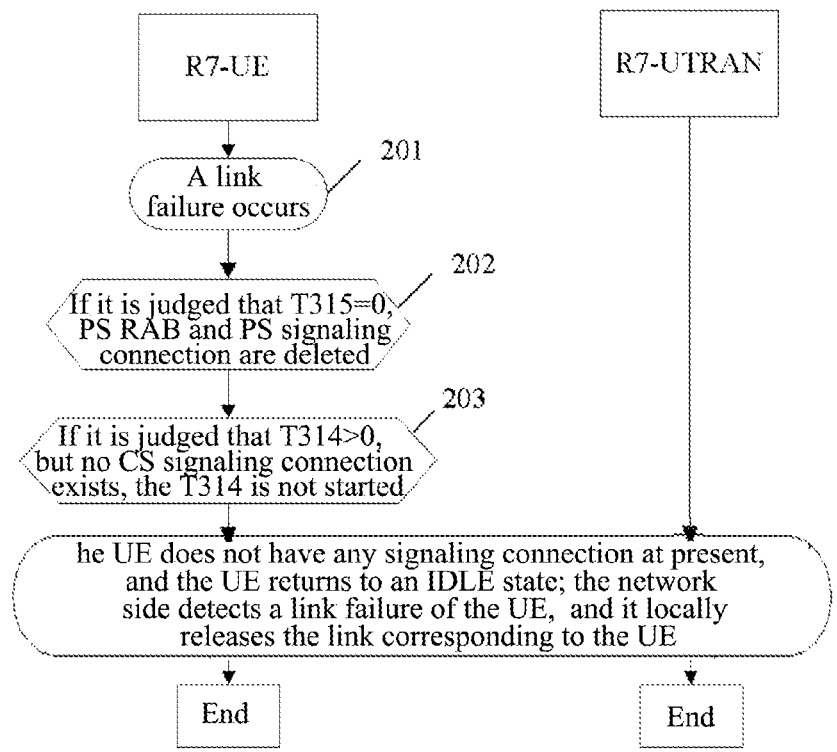
FIG. 3 is a flow diagram of the method for processing the data transmission services according to the embodiment 3 of the present document.

If the UE judges that the T315 is 0, it deletes the PS service bearer (RAB) and the PS signaling connection, the UE does not have any signaling connection at this point, and it directly enters the idle state, but a Packet Data Protocol (PDP) context used for uploading and downloading services still exists at the moment, once data are uploaded on the data plane, the UE in the idle state will be triggered to reinitiate the service request to the network side to reestablish the service; and when the data at the network side are required to be transmitted to the UE, the network side will send a paging message, and the UE which receives the paging message will initiate a link establishment process to recover the service. As shown in FIG. 3, the followings steps are included.

In step 201, after establishing the service bearer of the packet-switched domain (the PS domain RAB) through the service request, the terminal will carry out normal data uploading and downloading services in the dedicated state (Cell-DCH), and the network side configures the reestablishment timers as T315=0 and T314>0 at this point.

After the terminal in movement enters the area with a worse signal coverage, a radio link disconnection will occur at the terminal side, and it is shown as a stream interruption in service. The processing by the terminal in such a situation proceeds to step 202.

In step 202, after the above situation of stream interruption appears, if the terminal with the R7 upgrade judges that the T315=0, it deletes the PS RAB and PS signaling connection.

In step 203, it is judged that the T314>0, but the CS signaling connection does not exist, thus the T314 is not started. No reestablishment timer is started at this point, the UE also has no signaling connection, the UE directly performs processing of returning to the IDLE state in local, but the PDP context corresponding to the services of the packet-switched domain may still exist at the moment.

After detecting that the link corresponding to the UE is failed, a Universal Mobile Telecommunications System (UMTS) Terrestrial Radio Access Network (UTRAN) releases the link corresponding to the UE.

After the stream interruption, if data are still required to be uploaded on the data plane of the terminal, and it is detected that the link of the bottom layer has been released, the data plane will request the signaling plane for reinitiating a service establishment request, and after the service reestablishment is successful, the data plane restores the normal transmission of the data.

After the stream interruption, if data are still required to be transmitted on the data plane of the network side, a paging message will be sent to the terminal, the terminal will reinitiate the service establishment request after receiving the paging, and after the service reestablishment is successful, the data plane restores the normal transmission of the data.

Figure 4:
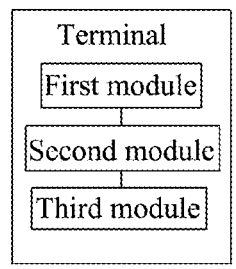
FIG. 4 is a schematic diagram of the terminal according to the embodiment 3 of the present document.

FIG. 4 is a schematic diagram of the terminal according to the embodiment 3 of the present document, and as shown in FIG. 4, the terminal of the embodiment includes:
- a first module, used to: after a radio link disconnection occurs in a process of only performing data transmission services of a packet-switched domain in a dedicated state, if judging that a timing value configured with a first timer is 0, delete a radio access bearer and a signaling connection of the packet-switched domain; and
- a second module, used to: in a case that the first module judges that a timing value configured with a second timer is not 0 and no CS domain signaling connection exists, return to an idle state, wherein,
- the first timer is a timer used for monitoring a reestablishment of packet-switched domain services;
- the second timer is a timer used for monitoring a reestablishment of circuit-switched domain services.

The terminal of the embodiment also can include:
- a third module, used to: after the second module returns to the idle state, if detecting that data are still uploaded or a paging message of a network side is received, initiate a service request to the network side.

The foregoing problem can be effectively solved in all the above three embodiments. The advantages and disadvantages of these three embodiments will be analyzed and compared in combination with the practice.

In the embodiment 1, the embodiment points out that the CU is also initiated without any signaling connection at the moment, such processing can be identical with the processing flow of the low release, but no signaling connection exists at this point, it is meaningless to reestablish the link; but if the network side directly sends the RRCConnRel after receiving the CU, the UE will return to idle, and the final result is the same as that of the embodiment 3.

In addition, from the release compatibility perspective, when the terminal with the release upgrade accesses the low-release network, the terminal initiates a CU request, the network side will send the CUC, and the terminal is reestablished to the Cell-DCH state, but the terminal believes that no signaling connection exists at this point, and the network side believes that the PS signaling connection still exists due to the implementation according to the low-release protocol, thus it causes that a state of the UE and a state of the network side are inconsistent.

In the embodiment 2, it has the same drawback as that of the embodiment 1. Moreover, according to the processing principle of the embodiment 2, when only the PS domain services exist and only the T314 is configured to be not 0, the T314 is not started and the CU request is sent directly, whether the value of the T314 is 0 or not is indifferent. However, it is clearly pointed out that the UE needs to return to the IDLE state when both the T314 and the T315 are 0. The processing of the embodiment goes against the processing principle of the protocol.

In the embodiment 3, the given processing is the terminal directly returning to the idle state when encountering such a situation, since no signaling connection exists at this point, and it is not so meaningful even though the network side sends the CUC to reestablish the connection after the terminal sends the CU. After returning to the idle state, if there still exist data required to be transmitted, the data stream of the data plane will trigger the terminal or the network to initiate the reestablishment process of the services. In addition, from the release compatibility perspective, when the low-release terminal accesses the high-release network, the terminal initiates the CU in such a situation, it is reasonable for the network directly to send the RRCConnRel to release the RRC connection of the terminal or send the CUC to reestablish the link of the terminal, and the problem of release compatibility will not exist; on the contrary, when the high-release terminal accesses the low-release network, the terminal directly returns to the idle when facing such a situation, and also the problem of release compatibility will not exist.

Based on the above analysis, the processing flow of the embodiment 3 is simple, and the problem raised in the present document can be effectively solved, the processing flow after the terminal has the stream interruption is perfected, and it can be better compatible with the low-release device.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above embodiments also can be implemented by using one or multiple integrated circuits. Correspondingly, each module/unit in the above embodiments can be implemented in a form of hardware, and also can be implemented in a form of software function module. The present document is not limited to any combination of hardware and software in a specific form.

The above description is only the preferred embodiments of the present document. Certainly, the present document can still have other various embodiments. The skilled familiar to the art can make various corresponding changes and transformations according to the present document without departing from the spirit and essence of the present document, and these corresponding changes and transformations shall all fall into the protection scope of the appended claims of the present document.

INDUSTRIAL APPLICABILITY

Compared with the related art, the embodiments of the present document give preferred schemes to perfect the flow for processing the stream interruption of the terminal in the data transmission process, which can solve the drawbacks of the existing flow.

What is claimed is:

1. A method for processing data transmission services, comprising:
   after a radio link disconnection occurs in a process of only performing the data transmission services of a packet-switched domain in a dedicated state in a 3rd Generation (3G) mobile communication system, when a terminal judges that a timing value configured with a first timer is 0, deleting a radio access bearer and a signaling connection of the packet-switched domain; and
   when judging that a timing value configured with a second timer is not 0, initiating a cell update process, wherein,
   the first timer is a timer used for monitoring a reestablishment of packet-switched domain services;
   the second timer is a timer used for monitoring a reestablishment of circuit-switched domain services.

2. The method according to claim 1, wherein, after the terminal judges that the timing value configured with the second timer is not 0, the method further comprises:
   the terminal starting the second timer.

3. A terminal, comprising hardware performing instructions stored in a non-transitory computer readable medium which executes the following steps:
 after a radio link disconnection occurs in a process of only performing data transmission services of a packet-switched domain in a dedicated state in a 3rd Generation (3G) mobile communication system, when judging that a timing value configured with a first timer is 0, deleting a radio access bearer and a signaling connection of the packet-switched domain; and
 when judging that a timing value configured with a second timer is not 0, initiating a cell update process, wherein,
 the first timer is a timer used for monitoring a reestablishment of packet-switched domain services;
 the second timer is a timer used for monitoring a reestablishment of circuit-switched domain services.

4. The terminal according to claim 3, wherein, the hardware performing the instructions stored in the non-transitory computer readable medium further executes the following step:
 in a case of judging that the timing value configured with the second timer is not 0, starting the second timer.

5. A method for processing data transmission services, comprising:
 after a radio link disconnection occurs in a process of only performing the data transmission services of a packet-switched domain in a dedicated state in a 3rd Generation (3G) mobile communication system, when a terminal judges that a timing value configured with a first timer is 0, the terminal deleting a radio access bearer and a signaling connection of the packet-switched domain; and
 when judging that a timing value configured with a second timer is not 0 and no circuit-switched domain signaling connection exists, returning to an idle state, wherein,
 the first timer is a timer used for monitoring a reestablishment of packet-switched domain services;
 the second timer is a timer used for monitoring a reestablishment of circuit-switched domain services.

6. The method according to claim 5, after returning to the idle state, the method further comprises:
 if detecting that data are still uploaded or a paging message of a network side is received, the terminal initiating a service request to the network side.

7. A terminal, comprising hardware performing instructions stored in a non-transitory computer readable medium which executes the following steps:
 after a radio link disconnection occurs in a process of only performing data transmission services of a packet-switched domain in a dedicated state in a 3rd Generation (3G) mobile communication system, when judging that a timing value configured with a first timer is 0, deleting a radio access bearer and a signaling connection of the packet-switched domain; and
 in a case of judging that a timing value configured with a second timer is not 0 and no circuit-switched domain signaling connection exists, returning to an idle state, wherein,
 the first timer is a timer used for monitoring a reestablishment of packet-switched domain services;
 the second timer is a timer used for monitoring a reestablishment of circuit-switched domain services.

8. The terminal according to claim 7, wherein the hardware performing the instructions stored in the non-transitory computer readable medium further executes the following steps: after returning to the idle state, if detecting that data are still uploaded or a paging message of a network side is received, initiating a service request to the network side.

* * * * *